COLOR TELEVISION TUBE AND METHOD FOR COLOR TELEVISION

Filed Dec. 29, 1954

Inventor:
James M. Lafferty,
by Paul A. Frank
His Attorney.

2,888,603
Patented May 26, 1959

2,888,603

COLOR TELEVISION TUBE AND METHOD FOR COLOR TELEVISION

James M. Lafferty, Schenectady, N.Y., assignor to General Electric Company, a corporation of New York Application December 29, 1954, Serial No. 478,288

4 Claims. (Cl. 315—14)

Figures 1, 2, 3, 4, 5:
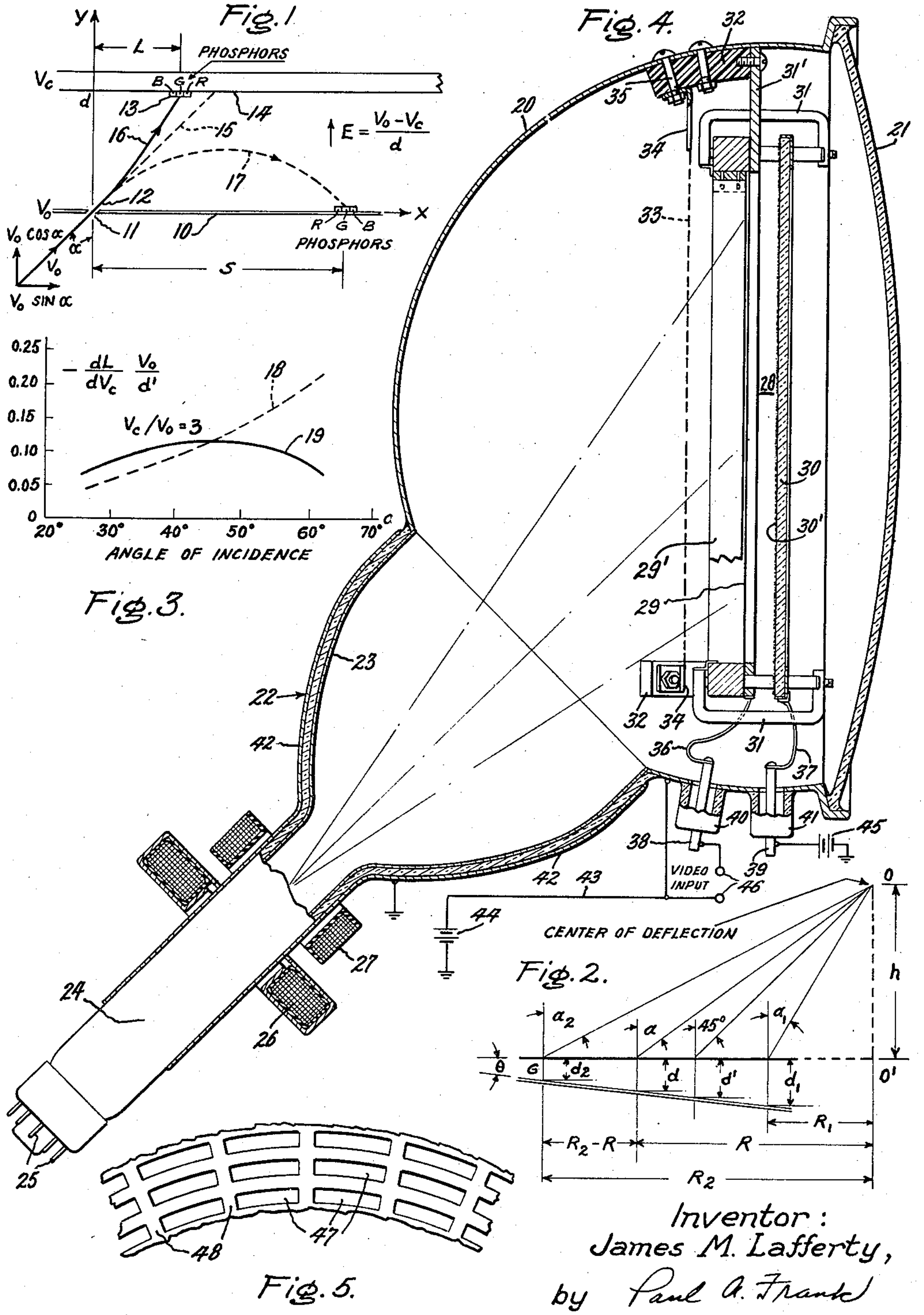

This invention relates to an improved color television tube and method for color television which is suited for utilization in a beam deflection type color television tube and it is particularly described in that connection.

A number of television receiving tubes for reproducing color television signals are known to the art. Among these are picture tubes which include an end wall which is scanned by an electron beam. The inner end of the wall is coated with a number of layers of color producing phosphors and a given color producing phosphor is excited by varying the velocity of the electrons in the beam at the position in the scan where it is desired to excite the given color. Color television tubes of this type are difficult to manufacture and the associated circuitry is necessarily cumbersome and complicated.

An improvement in the art of color television picture tubes is disclosed in applicant's copending application, Serial No. 208,875, filed February 1, 1951, now Patent No. 2,741,720, and assigned to the same assignee as this invention. This application discloses tubes of the type consisting of a cathode ray tube having a transparent end wall and a conducting coating thereon and a perforated conducting screen in close proximity to this end wall with a mosaic of color producing phosphors placed on the perforated screen on the side facing the end wall. The end wall is provided with a conducting coating and is maintained at a potential lower than the potential of the perforated screen. Electrons from an electron gun in the tube approach the perforated screen at an acute angle of incidence, pass through the screen and are retarded by the electric field so as to return to and strike the color producing phosphor mosaic. The displacement of the point of impact of the electrons returning to the perforated screen after having been retarded by the electric field between the screen and the end wall is controlled by a modulating voltage applied to the conducting end wall so that the different colors are selected in accordance with this modulating voltage.

It is an aspect and object of this invention to provide a novel color television picture tube and method wherein more efficient use is made of the electrons in the electron beam and color selection is effected so as to necessitate little or no shielding of the viewing screen.

It is therefore an object of this invention to provide an improved color television picture tube and method for color television.

It is also an object of this invention to provide an improved post acceleration color television picture tube and method of operation resulting in uniform deflection sensitivity over a wide range of electron beam angles of incidence.

Another object of this invention is to provide an improved color television picture tube and method of operation in which the necessity for viewing screen shielding is minimized.

An additional object of this invention is to provide an improved color television picture tube and method of producing color television pictures which makes highly efficient use of the electron beam in a color television picture tube and requires a relatively low modulating voltage to effect color selection.

According to an aspect of this invention a color television picture is produced in a cathode ray tube by passing a stream of electrons through a perforated screen to strike a layer of different color producing phosphors. The screen is voltage modulated to cause the electron beam to excite selected phosphors of said different color producing phosphors in accordance with the modulating voltage.

The other objects and important aspects of this invention will become more apparent from the succeeding paragraphs and claims when taken in connection with the figures of the drawing in which Figures 1, 2 and 3 are diagrammatic illustrations useful in explaining this invention; Figure 4 illustrates a color television tube constructed in accordance with this invention; and Figure 5 illustrates a detail of the structure shown in Figure 4.

In order to obtain a complete understanding of this invention reference is made to the illustration designated by Figure 1 wherein there is shown a thin perforated conducting screen or shadow mask 10 having a perforation 11 through which a stream of electrons 12 can pass to excite phosphor layer 13 on transparent conducting end wall 14. The end wall 14 may consist of the end wall of a cathode ray tube having a thin transparent conducting coating such as tin oxide placed on the inner surface thereof or may consist of a transparent plate having a conducting coating and supported within a cathode ray tube. The different color producing phosphors B, G and R are placed in repeating succession over the face of plate 14 in the form of a mosaic, preferably in curved strips or concentric circles. The perforated screen is maintained at a voltage $V_0$ and the transparent conducting end wall is maintained at a potential $V_c$. The distance between the screen and the end wall is designated by the distance *d*. As an aid in describing the ballistics of an electron which passes through perforation 11 there are shown coordinate axes X and Y. The displacement of the point of impact of an electron from the point of entrance through the perforated screen along the X axis is designated by the distance L and in a like manner, in the case where the electron is reflected by the transparent screen, by the distance S.

The electric field E is equal to the difference between $V_0$ and $V_c$ divided by the distance between the screen and the end wall *d*. Electrons in the electron stream are assumed to enter through perforation 11 with an initial velocity $v_0$ at an angle of incidence $\alpha$ to a line perpendicular to the screen.

The method of selecting colors in its simplest form, and by way of example, utilizes one electron beam only, however, multiple beams may be employed. The incident beam is directed so that the electrons in the beam have an initial velocity component transverse to a uniform electric field and, as illustrated in Figure 1, the electrons in the beam are deflected by means of the uniform electric field between the end wall and perforated screen.

The electron illustrated in Figure 1 enters the uniform electric field E and has a component of velocity $v_0 \sin \alpha$, normal to the field. The disposition of the electron in this field depends on the magnitude and direction of the field with respect to the velocity of the electron. If $V_0=V_c$, the electric field is zero and the electron continues along straight line 15 striking the upper electrode 14. If $V_c$ is greater than $V_0$, the electric field is negative and the electron is accelerated towards the upper electrode following a parabolic path, such as path 16, which is concave upward. If $V_c$ is less than $V_0$, the electric field is positive and the electron follows a parabolic path, such as path 17, which is concave downward. It can be shown that if $V_c$ is greater than $V_0 \sin^2 \alpha$, the electron will still strike the upper electrode however, and if $V_c$ is less than $V_0 \sin^2 \alpha$ the beam will return to the lower electrode.

There are, thus, two modes of operation for this device, one in which the electron strikes the upper electrode and the other in which it strikes the lower electrode. The exact point at which the electron strikes either of the electrodes, the transparent conducting end wall or the perforated screen, is controlled by varying the initial velocity i.e. magnitude and/or direction, of the electron or the electric field between the electrodes or a combination of both. Thus an electron beam can be caused to excite a series of color producing phosphors in a sequential manner by variation of the proper parameters.

In the interests of simplifying this description only a preferred embodiment wherein the electrons in the electron beam are post accelerated toward the transparent conducting end wall is discussed throughout the remainder of this specification; however, it will be readily appreciated by those skilled in the art that the principles hereinafter discussed by way of example can equally well be applied to the retarding field condition wherein $V_c$ is at a lower potential than $V_0$ so that the electrons return to the perforated screen 10.

For the purposes of the immediately following description perforated electrode 10 and conducting transparent conducting end wall 14 will be referred to from time to time as the lower and upper electrodes respectively. It can easily be shown that the electron-trajectory equation which applies between the electrodes 10 and 14 for electrons emitted from a cathode at potential $V_k$ is $$y = x \cot \alpha - x^2(1 - V_c/V_0)/4(1 - V_k/V_0)d \sin^2 \alpha \quad (1)$$

By letting $V_k = 0$, differentiating Equation 1 with respect to $x$ and equating the results to 0, it is found that $x = (d \sin^2 \alpha)/(1 - V_c/V_0)$. Substituting this value back in the Equation 1 gives the ordinate of the vertex of the parabolic trajectory;

$$y_m = (d \cos^2 \alpha)/(1 - V_c/V_0) \quad (2)$$

If $y_m = d$, then, on solving Equation 2, $V_c/V_0 = \sin^2 \alpha$ and the beam is tangent to the upper electrode.

The distance L which the beam is displaced on striking the screen is determined by setting $y = d$ in Equation 1 and solving for $x$:

$$L = \frac{(1 - V_k/V_0)d \sin 2\alpha}{1 - V_c/V_0}\left\{1 - \left[\frac{V_c/V_0 - \sin^2 \alpha - (V_k/V_0)\cos^2 \alpha}{(1 - V_k/V_0)\cos^2 \alpha}\right]^{1/2}\right\} \quad (3)$$

If the cathode is at zero potential, this expression reduces to $$L = \frac{d \sin 2\alpha}{1 - V_c/V_0}\left[1 - \frac{(V_c/V_0 - \sin^2 \alpha)^{1/2}}{\cos \alpha}\right] \quad (4)$$

The beam displacement L may be varied by changing the cathode, perforated electrode or transparent end wall voltages. The rate of change of beam displacement with respect to the cathode voltage can be found by differentiating beam displacement L with respect to cathode voltage $V_k$. For the case of zero cathode potential, this reduces to $$\frac{dL}{dV_k} = \frac{-d \sin 2\alpha}{(1 - V_c/V_0)V_0}\left[1 - \frac{V_c/V_0 + \cos 2\alpha}{2(V_c/V_0 - \sin^2 \alpha)^{1/2} \cos \alpha}\right] \quad (5)$$

The rate of change of beam displacement with respect to the transparent conducting end wall voltage for zero cathode potential can be found by differentiating displacement L with respect to upper electrode voltage $V_c$ to obtain:

$$\frac{dL}{dV_c} = \frac{d \sin 2\alpha}{(1 - V_c/V_0)^2 V_0}\left[1 - \frac{V_c/V_0 + \cos 2\alpha}{2(V_c/V_0 - \sin^2 \alpha)^{1/2} \cos \alpha}\right] \quad (6)$$

and, in a like manner, it may be shown that the displacement L with respect to the perforated screen voltage $V_0$ is $$\frac{dL}{dV_0} = \frac{-d(V_c/V_0) \sin 2\alpha}{(1 - V_c/V_0)^2 V_0}\left[1 - \frac{V_c/V_0 + \cos 2\alpha}{2(V_c/V_0 - \sin^2 \alpha)^{1/2} \cos \alpha}\right] \quad (7)$$

A comparison of Equations 5, 6 and 7 shows that $$\frac{dL}{dV_0} = -(V_c/V_0)\frac{dL}{dV_c} = \frac{V_c/V_0}{1 - V_c/V_0}\frac{dL}{dV_k} \quad (8)$$

Also, the electric field has two focusing effects on the beam electrons. The first occurs at the point where the beam enters the field through the aperture 11 in the perforated screen and the second occurs throughout the trajectory as the beam electrons traverse the field. That is, the apertures in the perforated screen act as lens by virtue of the difference in the electric fields on the two sides of the mask. If the openings in the perforated screen are in the form of slits, it may be shown that the focal length is given approximately by the equation.

$$f = \frac{-2d \cos^2 \alpha}{1 - V_c/V_0} \quad (9)$$

If $V_c$ is less than $V_0$, the retarding field results in the slit appearing as a diverging lens with a negative focal length. If $V_c$ is greater than $V_0$, the accelerating field produces a converging lens action at the slit.

It can be shown that when $\alpha$ equals 45 degrees, optimum post acceleration focusing occurs when the upper electrode voltage is 3.414 times the beam voltage $V_0$. If this substitution is made in Equation 8, the following expression results, $$\frac{dL}{dV_0} = -3.414\frac{dL}{dV_c} = -1.414\frac{dL}{dV_k} \quad (10)$$

It is thus seen that of the three methods of modulation, the deflection sensitivity is least for the end wall voltage modulation and greatest for the perforated screen voltage modulation. The high sensitivity of this latter method results from the favorable combination of two effects. That is, L may be increased by decreasing the electric field E or by increasing the initial velocity of the electron beam as it enters this field E. Increasing the beam voltage $V_0$ does both of these things simultaneously, while changing the upper electrode voltage or cathode voltage does only one of these at a time.

It is thus seen that by holding the transparent conducting end wall and anode, i.e. aquadag wall coating, voltages constant and modulating the perforated screen voltage the shielding problem for high color-switching rates is simplified since the perforated screen can be shielded by the fixed potential end wall.

By keeping the wall coating at a constant potential, the deflection sensitivity at the yoke of a color television tube does not change when the perforated screen is voltage modulated. There is, however, a weak electrostatic lens field established between the wall coating and the perforated screen which tends to cause a slight displacement and change in the angle of incidence of the electron beam as it strikes the perforated screen. In practical cases this displacement may be the width of several raster lines and the change in angle of incidence may be as much as 2 degrees. Therefore, as will be more fully described in succeeding paragraphs, an electrode, which is at the aquadag coating potential, is placed near the perforated screen to confine the lens field so that there is negligible beam displacement at the mask.

Thus, modulation of the perforated screen voltage changes the displacement of the beam at the transparent end wall because of the resulting change, in the angle of incidence $\alpha$, in the initial velocity of the electrons in the beam as they enter the accelerating field, and in the accelerating field between the screen and end wall.

Figures 2 and 3 are now referred to as an aid in a discussion of the effect of variation in angle of incidence of the electron beam on the perforated screen. Curve 18 illustrates the deflection sensitivity as a function of the angle of incidence where the perforated screen and the transparent end wall are substantially parallel. It will be seen that the deflection sensitivity increases rapidly with the angle of incidence. From 30° to 60° the deflection sensitivity increases approximately 124%. This is generally undesirable from the standpoint of obtaining a screen of uniform brightness. That is, if at a particular switching voltage the phosphor lines are separated 6 mils, for the 60° angle of incidence area on the screen, the lines must be separated 20 mils for the 30 incidence area.

This difficulty may be corrected to a large extent by tilting the screen with respect to the aperture mask so that the spacing is increased for small angles of incidence and decreased for large angles of incidence. It is also possible to tilt the screen at the proper angle to make the deflection sensitivity equal for two different angles of incidence. This relationship can be derived with the aid of Figure 2. If $d_2$ is the mask-screen spacing for $\alpha$ equal $\alpha_2$ and $\theta$ is the angle between the mask and screen, it follows from Figure 2 that the spacing $d$ between the mask and the screen for any angle $\alpha$ is $d=d_2+(R_2-R)\tan\theta$ or $$d/h=d_2/h+(\tan\alpha_2-\tan\alpha)\tan\theta$$

This expression can be further developed to result in a final expression for $d$ which is found to be $$d=d_1\left[\frac{\tan\alpha_2-\tan\alpha_1+(K-1)(\tan\alpha_2-\tan\alpha)}{\tan\alpha_2-\tan\alpha_1+(K-1)(\tan\alpha_2-1)}\right] \quad (11)$$

where $K=d_1/d_2$.

By using this equation it can be shown that it is possible to tilt the screen so as to make the deflection sensitivity substantially equal at angles of incidence 30° and 60° with a peak sensitivity at an intermediate region of approximately 45°. This relationship is illustrated by curve 19 which is illustrated in Figure 3 of the drawing. Alternatively the transparent end wall and the perforated screen can be curved to achieve uniformity in deflection sensitivity. Alternatively the perforated screen and the transparent conducting end wall can be properly curved to give a nearly constant angle of electron beam incidence over all areas of the perforated screen resulting in uniform deflection sensitivity.

Figure 4 illustrates an example of color television picture tube incorporating this invention which can be conveniently incorporated in a color television receiver. The tube comprises an electrically conductive hemispherical body portion 20 having a transparent face 21 and a conical neck portion 22 having a conductive coating 23 secured to the inner surface thereof. Disposed in the conical neck portion 22 is an electron gun (not illustrated) such as, for example, that described and claimed in my copending patent application Serial No. 443,278, filed July 14, 1954, now Patent No. 2,852,716 and assigned to the same assignee as this invention. The electron gun is supported within portion 24 of the conical neck 22 of the tube and electrical connection is made to the gun through connectors 25. Conventional magnetic focusing and deflecting coils 26 and 27 respectively are provided for sweeping the electron beam produced by the gun across the end of the cathode ray tube. The deflection coils are energized by any conventional sweep apparatus (not shown) to obtain the desired sweep pattern.

Disposed in the hemispherical body portion 20 of the cathode ray tube is a perforated electrode structure 28 that includes an apertured or perforated conducting screen 29 having a plurality of symmetrically arranged apertures and a transparent conducting electrode member 30 having a transparent electrically conducting coating 30' on one surface thereof. On the inner surface of transparent conducting member 30 are arranged a plurality of symmetrically arranged different color light emitting phosphorescent materials. The layer of different color light producing phosphors can be arranged between the perforated screen 29 and conducting coating 30'. Alternatively the phosphors can be placed on the transparent member 30 on the side facing the perforated screen and then covered with a thin metallic film, such as aluminum, so that the reflecting characteristics of the aluminized conducting surface can be utilized to enhance the colored light output. The two electrode members 29 and 30 are secured in spaced-apart relationship with the phosphorescent material coated surface of conducting electrode 30 opposing the apertured perforated screen 29. The electrode members 29 and 30 are held together in assembled relationship by a plurality of mounting structures 31 which are described more fully in my copending U.S. patent application, Serial No. 269,978, filed February 5, 1952, now Patent No. 2,777,088, and assigned to the same assignee as this invention.

The assembled electrode structure is supported within hemispherical body member 20 transversely to and at an angle to the path of the electron beam produced by the electron gun by means of a plurality of electrically insulated projections 31'. These projections are secured to the mounting structures 32 which are riveted or bolted to the hemispherical body portion 20 of the tube envelope. A shielding electrode consisting of screen 33 is supported from lugs 34 and is maintained at the same potential as the aquadag or conductive coating 23 through the means of rivet connector 35 and hemispherical shell 20. This screen effectively confines the variable electrostatic lens field established by the voltage gradient between the screen 29 and the aquadag coating 23. In order to reduce microphonics caused by vibration of perforated screen 29 a thin metal band 29' is provided which extends across the center of perforated screen 29.

Leads 36 and 37 electrically connect perforated screen and transparent conducting end wall 30 to external leads 38 and 39 through glass tubulations 40 and 41 respectively. A grounded external shield 42 is provided and lead 43 connects with the metal hemisphere 20 which in turn makes contact with aquadag coating 23 and provides a circuit through power source 44 for maintaining the aquadag potential and the no signal potential of the perforated screen at voltage $V_0$. Potential source 45 maintains transparent conducting end wall 30 at accelerating potential $V_c$. A color signal for modulating the potential of the perforated screen is applied to terminals 46.

In operation, the electron gun produces an electron beam that is caused to scan over the surface of perforated screen 29 by means of suitably positioned vertical and horizontal deflecting coils 27. As the electron beam is scanned the electrons which pass through the perforations are focused and accelerated by the accelerating electric field existing between the screen and end wall and impinge upon selected ones of the different color light producing phosphors to produce a given color. The particular point at which the accelerated beam strikes the conducting end wall 30 depends upon the voltage modulation applied to perforated screen 29 through terminals 46. By adopting a non-uniform spacing between the perforated screen and the conducting transparent end wall or, alternatively, properly curving the screen and end wall substantially uniform deflection sensitivity is obtained.

As an example of an operating tube consider the case in which $V_c$ is approximately 20,000 volts, $V_0$ is approximately 6670 volts, the spacing between the electrodes is approximately ½" and the phosphor-strip spacing is approximately 0.015". With these voltages and spacings it can be shown that approximately 462 volts peak-to-peak is required to switch from one color strip to the next. Therefore, complete color switching requires a sine wave voltage on the perforated screen of approximately 327 volts (root mean square). The capacitance of a 20" rectangular perforated screen for this case is approximately 175 microfarads; thus, the power required to modulate the mask is not excessive.

Figure 5 illustrates an example of a perforated screen 29 provided with slits 47 separated by web lines 43. The aperture pattern, for example, may consist of slits that follow contour lines of constant angle of incidence for the electron beam upon the perforated screen. When the electron beam enters the screen anywhere along the arc defined by the aperture it makes a constant angle of incidence $\alpha$ with the screen and passing through the slit it strikes the phosphors on the transparent conducting end plates 30. The three phosphors that are to be excited by the electrons that pass through the mask are deposited on the end plate in the form of groups of three strips which are arcs of concentric circles corresponding to the apertures in the perforated screen. That is, in general, for every slit in the perforated screen there will be a set of three phosphor lines on the screen centered about the radius of the aperture in the screen.

Perforated screens of this type are further described in my above mentioned copending patent application Serial No. 269,978, now Patent 2,777,088, and my copending patent application Serial No. 281,996 filed April 12, 1952, now Patent No. 2,777,084, both of which are assigned to the same assignee as this invention. It should be fully appreciated that this form of apertured or perforated screen is described merely by way of example and that the screen may take other forms. For example, the perforated screen may consist of horizontal apertures or circular apertures wherein substantially constant deflection sensitivity is achieved by varying the spacing between the perforated screen and the transparent end wall.

A satisfactory screen may be fabricated from metal sheet of the order of 4½ mils thick and, since the electrons pass through the screen at an angle, the slits are made oblique so as to intercept a minimum number of electrons. This is done by etching the slits in the metal from both sides of the screen at once by a photoengraving process such as described in my aforementioned patent application Serial No. 281,996, now Patent No. 2,777,084. By off-setting the patterns on the two sides of the screen the desired oblique slit is obtained.

The perforated screen can be formed of any number of relatively high conductivity metals which have a sufficiently high yield point when utilized in thin sheet form. For example, copper-cobalt-beryllium alloy, copper nickel alloy, various types of stainless steel and iron-nickel-cobalt alloy may be utilized in the practice of this invention.

Any number of well known phosphors can be used to obtain the three primary colors; however, particularly good results are obtainable by utilizing for the blue color, calcium magnesium silicate-titanium activated; for the green color, zinc silicate-magnesium activated, and for the red color, zinc phosphate manganese activated. Sulfide phosphors are generally brighter, however, the oxide phosphors are considered to be more stable in general and to give color and brightness values that are consistently of good quality.

The phosphors can be applied to the transparent conducting screen by any satisfactory process such as by printing and/or engraving. For example, a series of lines can be printed on the conducting end wall with a clear adhesive vehicle and then dusted with a phosphor powder. After the lines are completely covered the excess phosphor is blown off with compressed air. The screen is then placed in proper position and a second set of adhesive vehicle lines are printed in juxtaposition to the first set. In this manner, a complete screen consisting of three different color producing phosphors can be printed easily and conveniently.

The transparent end wall can be formed by applying a conducting coating to a glass or plastic member prior to the application of the aforementioned color producing phosphors. For example, a transparent end wall can be formed by utilizing polished Pyrex glass and then coating the surface of the glass opposing the perforated screen with a layer of tin oxide. This results in a high degree of light transmission and relatively low resistance. It is noted that the cathode ray tube herein illustrated by way of example utilizes a separate transparent end wall on which the different color producing phosphors are placed; however, it should be readily appreciated by those skilled in the art that the end wall 21 of the cathode ray tube can be utilized in a similar manner.

It should be noted that the angle of incidence of the electron beam with the mask, which is illustrated as having an angle of approximately 45°, has no particular significance for this color television tube. That is, the greater the angle of incidence of the electron beam with the mask the greater will be the deflection sensitivity. The angle can approach 90° so that a substantially flat or picture on the wall type tube is obtained. How great an angle of incidence is used depends upon a compromise of adequate focusing, sweep, and the necessary keystone correction.

An advantage of this type of color television tube is the efficient use of the electron beam brought about by post acceleration and focusing. The mask for the transmission tube may be more than 80% transparent, i.e. approximately 80% of the area of the perforated screen is open thereby permitting passage of electrons in the electron beam, while reflection type tubes are limited to a perforated screen which is only about 25% transparent because space must be provided on the screen and between the perforations for the three color producing phosphors.

A color television picture tube constructed in accordance with this invention has all the advantages of prior known post acceleration color television tubes plus a lower color switching power, equal number of red, green and blue color phosphor producing lines with substantially equal resolution for all colors and decidedly less radiation from the internal color switching or selecting electrode. This is the result of utilization of a voltage modulated perforated screen or shadow mask the potential of which is determined by the incoming video signal received on a color television receiver and which is shielded by the fixed potential conducting end wall. In addition, this color television tube utilizes a single electron beam rather than multiple beams, although it should be recognized that the principles of this invention can be adapted to multiple gun opertaion. Furthermore, the capacitance between the color switching electrode is reduced thus greatly reducing the switching power requirements. The 45° tube requires a higher sweep power than some color television picture tubes, but the beam focuses more sharply which is important for single gun color tubes.

While this invention has been described with particular regard to an exemplary embodiment, it will be readily appreciated by those skilled in the art that the practice of this invention may take a wide variety of forms and be incorporated in a large number of different types of color television apparatus; therefore, it is intended, in the appended claims, to cover all variations and modifications coming within the true spirit and scope of this invention.

What I intend to claim and obtain by Letters Patent of the United States is:

1. In a color television receiver, a color television picture tube comprising a substantially transparent conducting support having a layer of different color producing phosphors thereon to provide a color screen, electron gun means supported within said tube for projecting a beam of electrons toward said color screen, a perforated conducting screen oriented between said gun means and color screen, means for maintaining said color screen at a positive direct current potential with respect to said perforated screen whereby electrons are accelerated and focused to strike said color producing phosphor layer after passing through said perforated screen, a shielding electrode oriented between said electron gun means and said perforated screen, a conducting surface surrounding said shielding electrode and electrically connected with said shielding electrode and said gun means to confine the variable electrostatic lens field established by the voltage gradient between said perforated conducting screen and said conductive surface to the area between said shielding electrode and said perforated conducting screen, and means for applying a modulating voltage signal to the perforated screen to effect electron excitation of desired phosphors of said different color producing phosphors in accordance with said voltage modulation.

2. A color television picture tube comprising a substantially transparent conducting end wall having a layer of different color producing phosphors thereon, at least one electron gun supported within said tube for projecting a beam of electrons toward said wall at an acute angle of incidence, a perforated conducting screen oriented between said gun and end wall, corresponding regions of said screen and end wall being non-uniformly spaced, means for maintaining said wall at a positive direct current potential with respect to said screen and having a magnitude approximately equal to three times the direct current potential of said perforated conducting screen whereby electrons are accelerated and focused to strike said different color producing phosphor layer after passing through said screen, means for applying a modulating voltage to the screen to cause said electrons of excite desired phosphors of said different color producing phosphors in accordance with the modulating voltage and a shielding electrode interposed between the electron gun and said screen, a conductive surface surrounding said shielding electrode and electrically connected with said shielding electrode and said electron gun to maintain said shielding electrode at the potential of said conducting surface and electron gun to minimize the varying electrostatic lens effect upon the electron beam due to the screen voltage modulation.

3. A color picture tube comprising a substantially transparent screen of extended area including discrete areas of different colored phosphors, electron gun means for directing a beam of electrons toward said color screen at an acute angle, a perforated color switching screen interposed between said electron gun means and said color screen and a shielding electrode interposed between said perforated screen and said electron gun means, means supporting said color screen and said perforated screen in mutually insulated relation and in insulated relation with respect to said shielding electrode and the wall of said tube providing an electrical connection between said electron gun means and said shielding electrode to maintain said shielding electrode, the wall of said tube and said gun means at substantially the same potential to minimize the varying electrostatic lens effect upon the electron beam of the voltage variations of said perforated color switching screen.

4. A color picture tube system comprising a substantially transparent screen of extended area including discrete areas of different colored phosphors, electron gun means for directing a beam of electrons toward said color screen at an acute angle, a perforated screen interposed between said electron gun means and said color screen and a shielding electrode interposed between said perforated screen and said electron gun means, means maintaining said shielding electrode and said gun means at substantially the same direct current potential including a conductive surface surrounding the beam path between said electron gun means and said shielding electrode and electrically connected with said shielding electrode and said gun means to minimize the focusing effect of fringing fields between said perforated screen and said surrounding conductive surface on the electron beam, means supporting said color screen and said perforated screen in mutually insulated relation and in insulated relation with respect to said shielding electrode, means maintaining said color screen at a positive direct current potential with respect to said shielding electrode and said perforated screen, said direct current potential having a magnitude approximately equal to three times the magnitude of the voltage of said perforated screen and means impressing a color switching signal voltage on said perforated screen to cause said beam to impinge selectively on said discrete areas of different colored phosphors.

References Cited in the file of this patent

UNITED STATES PATENTS

| | | |
|---|---|---|
| 2,594,513 | Stocker | Apr. 29, 1952 |
| 2,606,303 | Bramley | Aug. 5, 1952 |
| 2,669,675 | Lawrence | Feb. 16, 1954 |
| 2,728,024 | Ramberg | Dec. 20, 1955 |
| 2,728,025 | Weimer | Dec. 20, 1955 |
| 2,748,313 | Perilhou et al. | May 29, 1956 |
| 2,755,410 | Schlesinger | July 17, 1957 |
| 2,813,224 | Francken | Nov. 12, 1957 |

FOREIGN PATENTS

| | | |
|---|---|---|
| 713,875 | Great Britain | Aug. 18, 1954 |

OTHER REFERENCES

RCA Review; vol. XII, September, 1951, No. 3, part II (pages 512 and 513 relied on).